(12) United States Patent
Bollinger et al.

(10) Patent No.: US 11,506,165 B2
(45) Date of Patent: Nov. 22, 2022

(54) METHOD FOR ASCERTAINING A VARIABLE CHARACTERIZING A FLOW RATE OF A FUEL INJECTOR

(71) Applicant: Robert Bosch GmbH, Stuttgart (DE)

(72) Inventors: Stefan Bollinger, Marbach am Neckar (DE); Stefan Nonnenmacher, Stuttgart (DE); Daniel Heitz, Rutesheim (DE); Gabriel Iran, Bietigheim-Bissingen (DE); Kilian Bucher, Waldenbuch (DE); Michael Kutter, Leonberg (DE); Patrick Thum, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/453,972

(22) Filed: Nov. 8, 2021

(65) Prior Publication Data

US 2022/0145840 A1  May 12, 2022

(30) Foreign Application Priority Data

Nov. 11, 2020 (DE) ...................... 10 2020 214 175.4
Nov. 2, 2021 (DE) ...................... 10 2021 212 338.4

(51) Int. Cl.
*F02M 65/00* (2006.01)
*F02D 41/14* (2006.01)
(Continued)

(52) U.S. Cl.
CPC ......... *F02M 65/00* (2013.01); *F02D 41/1405* (2013.01); *F02D 41/247* (2013.01);
(Continued)

(58) Field of Classification Search
CPC ............ F02D 41/1405; F02D 41/2467; F02D 41/247; F02D 2041/1433;
(Continued)

(56) References Cited

U.S. PATENT DOCUMENTS

| 5,247,445 A * | 9/1993 | Miyano | F02D 41/2467 |
| | | | 123/674 |
| 2011/0079193 A1* | 4/2011 | Shibata | F02D 41/40 |
| | | | 123/295 |

(Continued)

FOREIGN PATENT DOCUMENTS

| DE | 19740608 A1 | 3/1999 |
| DE | 102008042714 A1 | 4/2009 |

(Continued)

*Primary Examiner* — Erick R Solis
(74) *Attorney, Agent, or Firm* — Norton Rose Fulbright US LLP; Gerard Messina (57) ABSTRACT

A method for ascertaining a variable characterizing a flow rate of a fuel injector during an operation of an internal combustion engine, to which the fuel injector is assigned. At least two input values for a data-based model are ascertained, and at least one output value is determined with the aid of the data-based model, on the basis of which a value for the variable characterizing the flow rate of the fuel injector is ascertained. The data-based model combines at least two methods differing from one another for ascertaining a variable characterizing a flow rate of a fuel injector.

14 Claims, 5 Drawing Sheets

(51) Int. Cl.
*F02D 41/24* (2006.01)
*G05B 13/02* (2006.01)

(52) U.S. Cl.
CPC ....... *F02D 41/2467* (2013.01); *F02M 65/003* (2013.01); *F02M 65/006* (2013.01); *G05B 13/027* (2013.01); *F02D 2041/1433* (2013.01); *F02D 2041/1436* (2013.01)

(58) Field of Classification Search
CPC .......... F02D 2041/1436; F02M 65/001; F02M 65/003; F02M 65/005; G05B 13/027
See application file for complete search history.

(56) References Cited

U.S. PATENT DOCUMENTS

| | | | |
|---|---|---|---|
| 2016/0333811 A1* | 11/2016 | Klingbeil | F02D 41/2467 |
| 2017/0234251 A1* | 8/2017 | Commenda | G05B 17/02 |
| | | | 701/33.1 |
| 2022/0128015 A1* | 4/2022 | Dussardier | F02D 41/2096 |

FOREIGN PATENT DOCUMENTS

| | | |
|---|---|---|
| DE | 102014204098 A1 | 9/2015 |
| DE | 102014207683 A1 | 10/2015 |
| DE | 102018212669 A1 | 1/2020 |
| DE | 102018213114 A1 | 2/2020 |
| DE | 102019209690 A1 | 3/2020 |

* cited by examiner

METHOD FOR ASCERTAINING A VARIABLE CHARACTERIZING A FLOW RATE OF A FUEL INJECTOR

FIELD

The present invention relates to a method for ascertaining a variable characterizing a flow rate of a fuel injector, in particular, a coking, during an operation of an internal combustion engine, to which the fuel injector is assigned, as well as to a processing unit and to a computer program for carrying out the method.

BACKGROUND INFORMATION

For modern internal combustion engines, a fuel supply system may be used, in which fuel is stored at a relatively high pressure in a high pressure accumulator, in a so-called rail, which is then fed to individual fuel injectors and introduced from these in a targeted manner into combustion chambers of the internal combustion engine. Even when fuel filters are used in such a fuel supply system, deposits or other contaminations may still occur at the openings of the injectors, whether as a result of particles or substances not filtered out of the fuel or else as a result of coking.

SUMMARY

According to the present invention, a method is provided for ascertaining a variable characterizing a flow rate of a fuel injector as well as a processing unit and a computer program for carrying out the method. Advantageous embodiments are disclosed herein.

The present invention involves the operation of internal combustion engines, in which fuel, which is drawn, for example, from a high pressure accumulator as mentioned at the outset, is introduced via fuel injectors into combustion chambers. As previously mentioned, such fuel injectors, and in particular, the injection nozzles, coke during the operation. The term coking refers to a relative flow rate change of injection nozzles as a result of deposit formation in the interior of the injection holes. Such a flow rate change refers in this case to a flow rate or volume flow (volume per unit time) in each case for a particular injection pressure, which drops over time from a nominal or original value to a typically lower value. In the process, injection nozzles generally coke to different degrees, a few of these sometimes also to a high degree. The extent of the coking is a function of many parameters such as the nozzle design, the fuel quality or the load profile of the application and has a direct influence on the hydraulic nozzle through-flow, the behavior of the fuel injectors and ultimately the quantity of injected fuel or fuel mass.

In light of this problem, it is an object of the present invention to detect, to quantify such coking—or also in general a variable characterizing a flow rate of the fuel injector, and to correct injector-specifically the activation of the fuel injector in such a way that the quantity of injected fuel remains constant (or corresponds preferably to the desired quantity of fuel). For this purpose, activation parameters or injection parameters such as, for example, pressure in the high pressure accumulator, (temporal) position and duration of the injection are adapted in accordance with the boundary conditions altered by the coking.

For this purpose, there are various possibilities or approaches, which are applied, for example, for fuel injectors designed as solenoid valve injectors. In spite of the advances achieved with such functions, the determination of the coking remains a challenge. Interactions with other tolerances as well as ambient influences hamper the determination of the coking to the accuracy required, so that it is not always possible to utilize the full functional scope of these functions.

Requirements of the accuracy of the detection of through-flow changing degradations such as coking are generally very high. Errors in methods in which a correction of the activation parameter of the fuel injector is carried out based on the closing point in time of the nozzle needle generally correlate one to one with errors of the injection quantity.

Against this background, it is provided, in accordance with an example embodiment of the present invention, to use a data-based model, which combines at least two methods differing from one another—or approaches or calculation methods—for ascertaining a variable characterizing a flow rate of a fuel injector. Such a variable may be an absolute value or a relative value of the flow rate, on the basis of which a coking may be deduced. In this case, at least two input values for the data-based model are ascertained and at least one output value is then determined with the aid of the data-based model, on the basis of which a value for the variable characterizing the flow rate of the fuel injector is ascertained.

Depending on the model, the output value may directly include the value of the flow rate. However, a relative value is also possible, for example, which indicates the reduction of the maximum flow rate of the fuel injector as compared to an earlier or nominal value. Input values or corresponding input variables considered in this case are, in particular, the input values or input variables used for the relevant methods, which are combined in the data-based model.

The at least one output value is preferably determined with the aid of the data-based model using machine learning, in particular, an artificial neural network. Based on the ascertained value for the variable, at least one activation parameter for the fuel injector may then, as previously mentioned, also be adapted. In other words, the data-based model may be implemented as an artificial neural network or, for example, may also be generated with the aid of Gaussian process regression or polynomial regression.

In this way, it is possible with the aid of, for example, machine learning, to determine injector-specifically a coking of the injection nozzles in the vehicle during an operation of the internal combustion engine in an operational processing unit such as the engine control unit without additional sensors. Sensors considered in this respect are all sensors used for the methods combined in the model. This may be, as explained further below, a "needle-closing sensor" or NCS, for example. Such a sensor is provided for the purpose of detecting the hydraulic pressure in the valve chamber of the fuel injector. With the aid of such a sensor, it is possible based on characteristic features of the pressure gradient to detect, in particular, the return point in time of the nozzle needle and the closing point in time of the nozzle needle in the fuel injector. The sensor in this case may, for example, be designed as a piezo sensor, which then outputs a corresponding voltage. Further sensors are not required, however.

Machine learning makes it possible to map complicated interactions of a plurality of model parameters compactly in a closed data model. This data model including inputs and outputs or input values and output values may, for example, be integrated into the engine control unit. During operation, the required model inputs are then provided accordingly by the engine control unit and the coking or the nozzle through-flow is calculated injector-specifically as the output.

A crucial point of the procedure provided is the combination of various model approaches for ascertaining or recognizing a degradation such as coking in a data model with the aid of, for example, machine learning. In this case, each individual method or each individual approach, considered individually, usually has specific weaknesses, which means that the required accuracy and robustness of the recognition of the degradation is not achieved. Bundling and combining the different model approaches for this purpose in one data model now results in the specific weakness of the various approaches carrying less weight, and thus a more accurate ascertainment of the coking is possible.

The combined approaches or their underlying models are based preferably purely on scalar injection system variables. In addition, only model parameters, in particular, are selected which, physically motivated according to the individual approaches, enable a conclusion to be drawn about the nozzle coking. It is not a matter of a pure pattern recognition. The parameter space is preferably—but not necessarily—concentrated on injection system variables. This facilitates considerably the provision of data for the model training as compared to engine data or vehicle data since, on the one hand, detailed numerical computational models for the injection system are present and, on the other hand, specific test equipment exist, with which the injection system may be measured separately from the internal combustion engine or from the engine. In this way, it is possible to carry out extensive parameter variations, for example, by exchanging the injection nozzles having different coking for system identification, and thus, providing the necessary data for model training and model test.

It also makes it possible to consider geometric parameters of the fuel injector in the data-based model. Geometric parameters in this case are understood to mean, in particular, so-called manufacturing data, which are integrated as additional model parameters. This includes, in particular, functional features, which may be checked individually and which change only little or not at all during the life of the vehicle. One example of such a functional features is the O/I ratio or outlet-inlet ratio (the control space of the injector has an inlet throttle and an outlet throttle; the O/I ratio refers to the flow ratio of the two throttles and influences the dynamics, i.e., opening and closing, of the nozzle needles). Manufacturing data may then be used as part of a model data set or model data point.

Preferred methods to be combined in the data-based model for ascertaining a flow rate of a fuel injector are explained in greater detail below.

One preferred method for ascertaining a flow rate of a fuel injector is one in which a, in particular, pressure-dependent measure of the variable (or degradation) is determined based on a return point in time of a nozzle needle of the fuel injector and/or a closing duration of the nozzle needle of the fuel injector. This return point in time and this closing duration may, for example, be determined using the previously mentioned sensor (NCS). Both variables (also referred to as timing variables) characterize the degradation or coking of the fuel injector. In this case, it is possible to exploit the fact that the needle closing duration, in particular—and thus also the injection duration—increases with increased coking. One weakness of this approach is that the needle closing duration is not solely a function of the coking of the injector but also a function of a guide clearance of the nozzle needle. The guide clearance is not constant, however, and may change over time as a function of the load, i.e., it "drifts." This drift of the guide clearance is an unknown which, in addition to other disturbances, distorts the coking model of this approach.

One further preferred method for ascertaining a flow rate of a fuel injector is one in which a measure of the degradation is determined based on characteristics (or features) of a signal profile of such a sensor (NCS) in the range of a closing point in time of a nozzle needle of the fuel injector. For this purpose, it may be possible, for example, to resort to a—typically present—filtered sensor signal. This shows a characteristic signal shape during needle closure, which is a function of sensor and/or fuel injector parameters such as the nozzle through-flow or the coking. This signal shape may be described by characteristic variables (for example, overshooting, undershooting, height, gradient, duration), which may be incorporated as parameters into the combined data model.

One further preferred method for ascertaining a flow rate of a fuel injector is one in which the start of delivery of a high pressure pump or high pressure fuel pump is a measure of the quantity of injected fuel. In order to maintain a defined pressure in the high pressure accumulator with the aid of, for example, a reciprocating pump with a fixed end of delivery, a corresponding filling of the stroke volume of the pump with fuel is required for compensating for a quantity of fuel drawn from the high pressure accumulator. The start of delivery characterizes the point in time at which the pump piston starts to deliver the fuel feed of the pump into the high pressure accumulator via a check valve against the pressure of the high pressure accumulator, and is a measure for the quantity of injected fuel. Thus, a measure of the variable or the degradation may also be obtained.

One further preferred method for ascertaining a flow rate of a fuel injector is one in which a measure of the degradation is determined based on a pressure change caused by an injection, in particular, a main injection, of the fuel injector and/or of a pressure gradient in a high pressure accumulator, via which the fuel injector is supplied. The determination of the through-flow from the gradient (which indicates a pressure change) of a (in particular, undisrupted) pressure drop in the high pressure accumulator during injection is a further model approach for recognizing coking. In this case, the pressure is determined, for example, at two defined points in time at the start and end of the pressure drop triggered by the injection, and the pressure difference is formed. The gradient of the pressure drop derived in this manner represents a direct measure of the nozzle through-flow or the coking when the nozzle needle is opened beyond the seat throttling mode.

The conditions and tolerances of the detection of the pressure in the high pressure accumulator influence the quality of the model. Thus, the real-time pressure in the high pressure accumulator is generally not available in the engine control unit, but merely a filtered, time-discrete signal. The detection of the pressure values must therefore be advantageously adapted to the boundary conditions of the pressure detection.

One further preferred method for ascertaining a flow rate of a fuel injector is one in which a measure of the degradation is determined based on a ratio of a quantity of fuel introduced during an injection of the fuel injector to a duration of the injection. With this possibility for determining the nozzle through-flow, the injection quantity is set in relation to the spray duration of the fuel injector (time from the opening of the needle to the closing of the needle). The spray duration or injection duration is known in the engine control unit, for example, with the aid of the NCS, but not the quantity of injected fuel. One potential substitute variable for the injection quantity is pressure drop Δp of an injection in the high pressure accumulator:

$$\Delta p = \frac{B}{V_H} \Delta V.$$

The drop Δp of the pressure under the given boundary conditions is proportional to quantity of fuel ΔV drawn from the high pressure accumulator or from its volume $V_H$. Pressure difference and relative volume change in this case are linked via bulk modulus B. Here, too, the correlation is distorted by specific tolerance influences such as, for example, the boundary conditions of the detection of the pressure in the high pressure accumulator, tolerances of the high pressure volume and/or influences of the fuel.

The mentioned variables for the various methods are thus considered as input variables for the data-based model.

It should be emphasized that, for example, in contrast to the first approach with return point in time and/or closing duration, the guide clearance of the nozzle needle in the last mentioned approaches has no influence on the ascertained coking. Conversely, tolerances of the detection of the rail pressure (pressure in the high pressure accumulator) have no influence on the timing variables of return point in time and closing duration.

A processing unit according to the present invention, for example, a control unit of a motor vehicle, is configured, in particular, programmed, to carry out a method according to the present invention.

The implementation of a method according to the present invention in the form of a computer program or computer program product including program code for carrying out all method steps is also advantageous, since this entails particularly low costs, in particular, if an operational control unit is also utilized for further tasks and is therefore present regardless. Suitable data media for providing the computer program are, in particular, magnetic, optical and electrical memories such as, for example, hard disks, flash memories, EEPROMs, DVDs and the like. A download of a program via computer networks (Internet, Intranet, etc.) is also possible.

Further advantages and embodiments of the present invention result from the description and from the figures.

The present invention is schematically represented in the figures based on one exemplary embodiment and is described below with reference to the figures.

DETAILED DESCRIPTION OF EXAMPLE EMBODIMENTS

Figure 1:
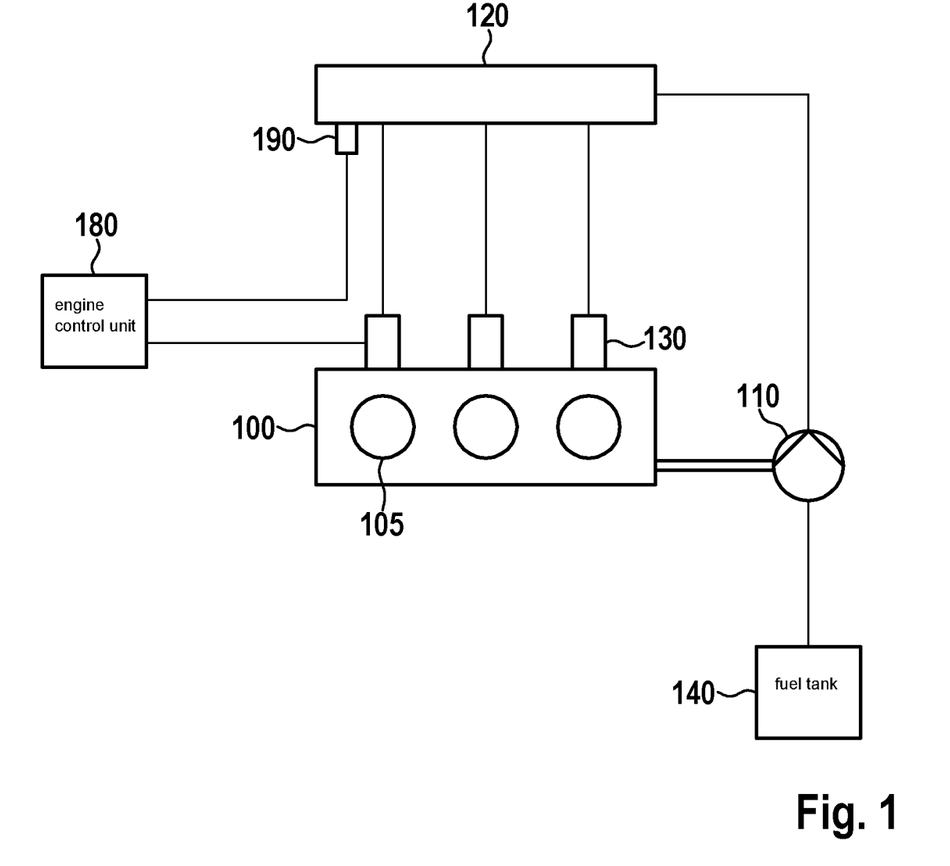
FIG. 1 schematically shows an internal combustion engine including a common rail system, which is suitable for carrying out a method according to the present invention.

An internal combustion engine 100 is schematically shown in FIG. 1, which is suitable for carrying out a method according to the present invention. Internal combustion engine 100 includes, for example, three combustion chambers and associated cylinders 105. Each combustion chamber 105 is assigned a fuel injector 130, each of which, in turn, is connected to a high pressure accumulator 120, a so-called rail, via which it is supplied with fuel. It is understood that a method according to the present invention may also be carried out in an internal combustion engine including an arbitrary number of cylinders, for example, four, six, eight or twelve cylinders. It is also understood that a method according to the present invention may also be carried out in an internal combustion engine that includes more than one rail, for example, V-engines including two rails.

Furthermore, high pressure accumulator 120 is fed fuel from a fuel tank 140 via a high pressure pump 110. High pressure pump 110 is coupled to internal combustion engine 100, namely, in such a way that the high pressure pump is driven via a crankshaft of the internal combustion engine, or via a camshaft which, in turn, is coupled to the crankshaft.

An activation of fuel injectors 130 for metering or injecting fuel into respective combustion chambers 105 takes place via a processing unit designed as an engine control unit 180. For the sake of clarity, only the connection from engine control unit 180 to one fuel injector 130 is represented; it is understood, however, that each fuel injector 130 is connected accordingly to the engine control unit. Each fuel injector 130 in this case may be specifically activated. Engine control unit 180 is further configured to detect the fuel pressure in high pressure accumulator 120 with the aid of a pressure sensor 190.

Figure 2:
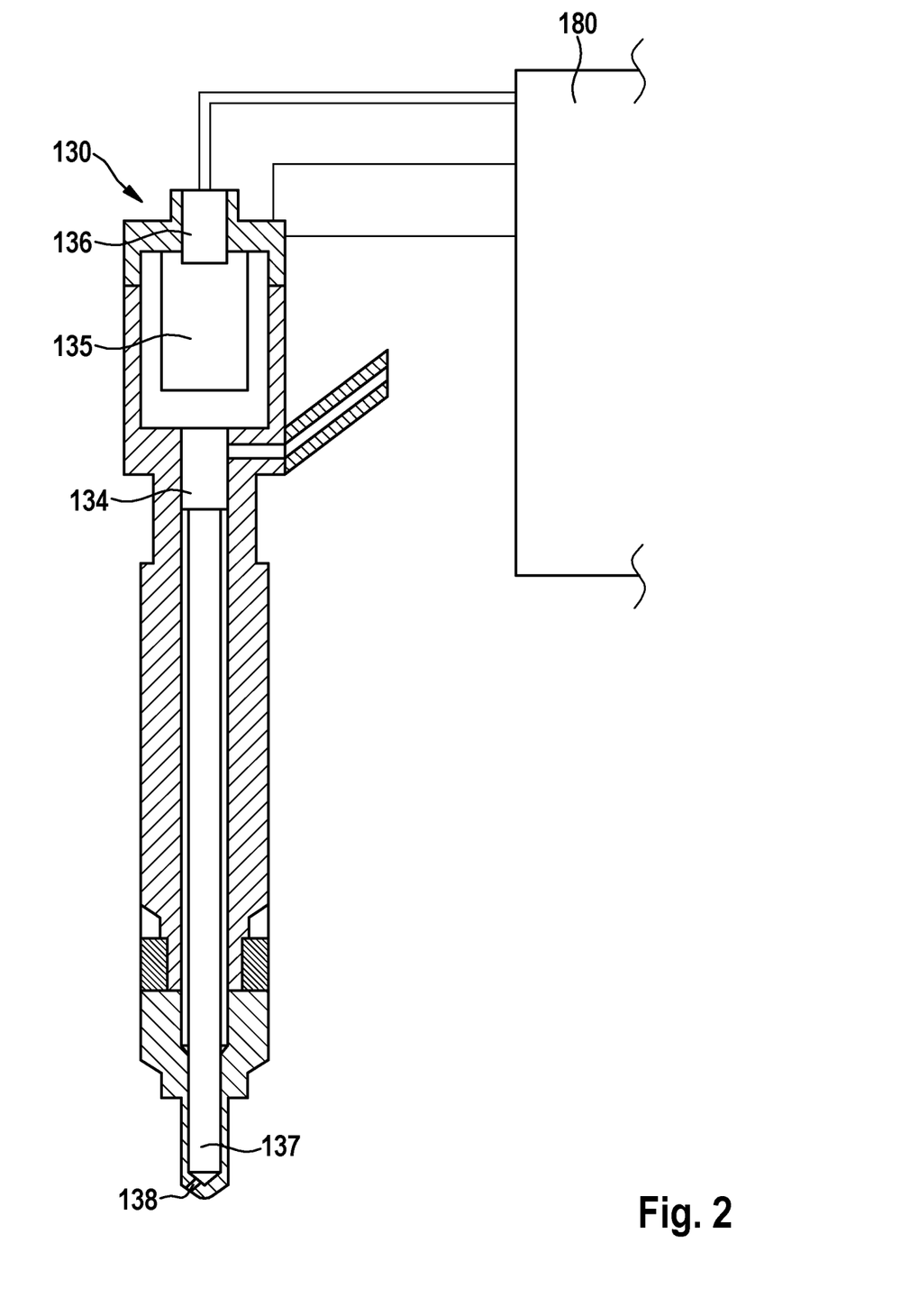
FIG. 2 schematically shows a fuel injector, in which a method according to the present invention is implementable.

A fuel injector 130 including an actuator 135 designed as a solenoid valve (the procedure may, in principle, also be applied in a fuel injector that includes a piezo actuator) and associated NCS sensor 136, as it may be used, for example, in internal combustion engine 100 according to FIG. 1, is shown by way of example in FIG. 2. Actuator 135 is used to activate a servo valve 134 in fuel injector 130. A nozzle needle 137 is also shown, which is able to unblock and close through-flow openings or nozzle holes 138 for injecting fuel.

Sensor 136 is situated, for example, at fuel injector 130 in such a way that the sensor signal responds to pressure changes in the valve chamber, as a result of which characteristic points in time of injection processes with the aid of fuel injector 130 such as opening and closing of the nozzle needle or valve needle may then be deduced. Actuator 135 is connected with two activation lines, for example, to an output phase in engine control unit 180. Sensor 136 is connected here via two inputs to engine control unit 180.

Figure 3:
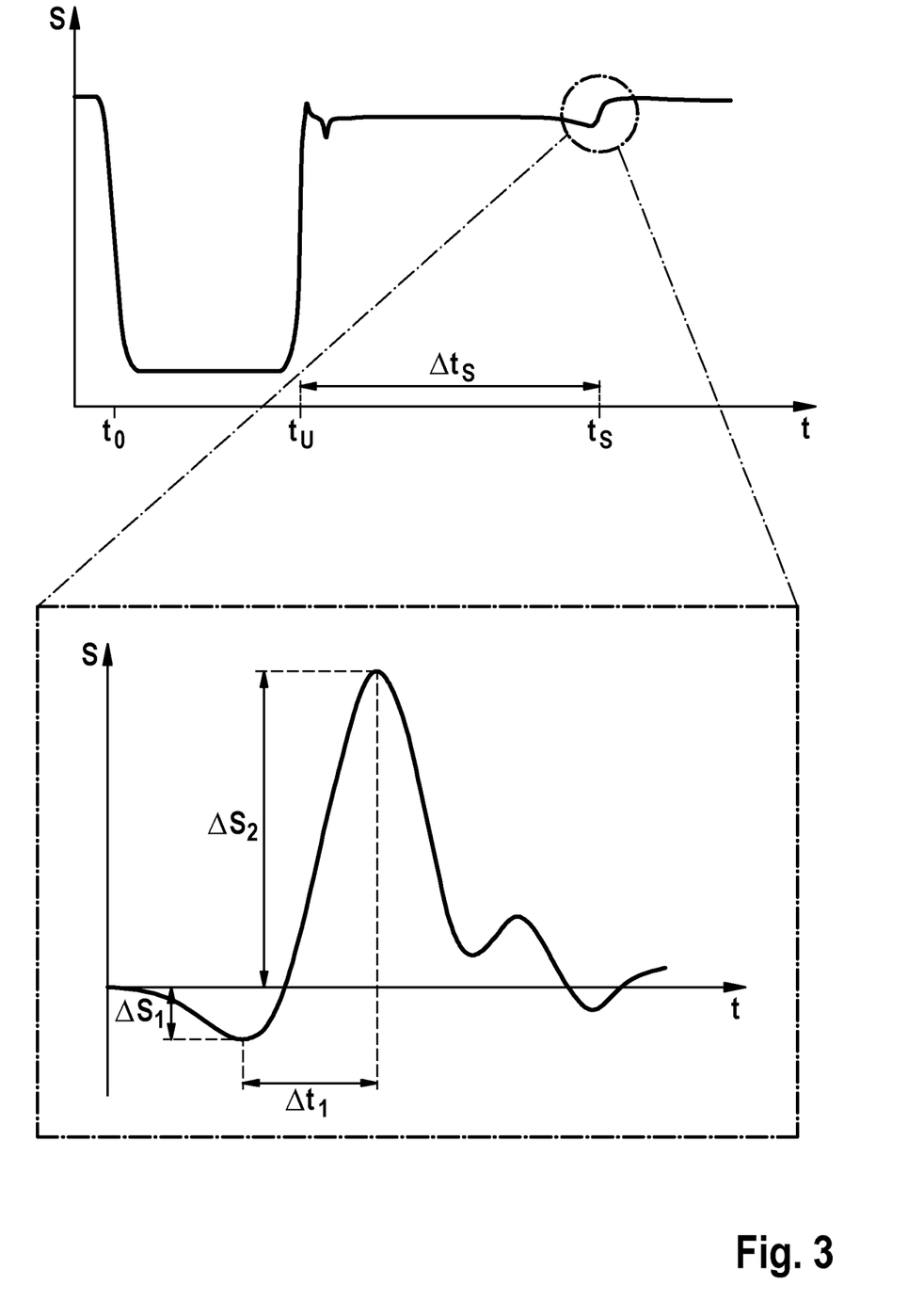
FIG. 3 schematically shows a signal profile, on the basis of which a part of a method according to the present invention in one preferred specific embodiment is explained.

A signal profile S over a time t is schematically shown in FIG. 3, on the basis of which a part of a method according to the present invention in one preferred specific embodiment is explained. Signal profile S represents a profile of the signal supplied by an NCS, which is a voltage, for example.

On the basis of this profile, it is possible, in principle, to determine a point in time characteristic of the injection process, such as an opening point in time $t_o$, a return point in time $t_u$ of the nozzle needle as well as a closing point in time $t_s$. In this way, it is also possible, for example, to determine closing duration $\Delta t_s$ of the nozzle needle (as $i_s$–$t_u$).

Taking the prevailing pressure in the high pressure accumulator in this case into consideration, it is possible based on these timing variables, in principle, to deduce the through-flow through the fuel injector, and thus a coking. As mentioned, the needle closing duration is, however, not solely a function of the coking of the injector, but also of the guide clearance of the nozzle needle, which is usually not constant.

Against this background, this procedure may also be combined in the data-based model with further, various methods or approaches for ascertaining a flow rate of a fuel injector.

One further such method is also explained with reference to FIG. 3. The range around closing point in time $i_s$ may be seen in the enlarged detail of signal profile S represented. The specific profile there may be characterized, for example, based on particular characteristics such as signal drop $\Delta S_1$, signal rise $\Delta S_2$ (or also minimum or maximum value with respect to a reference, or also its difference), as well as distance $\Delta t_1$ between the minimum value and maximum value in this area.

This characteristic signal shape is a function of sensor parameters and/or fuel injector parameters such as the nozzle through-flow or the coking. The characteristic variables may be incorporated within the scope of a further approach as parameters into the combined data model.

Figure 4:
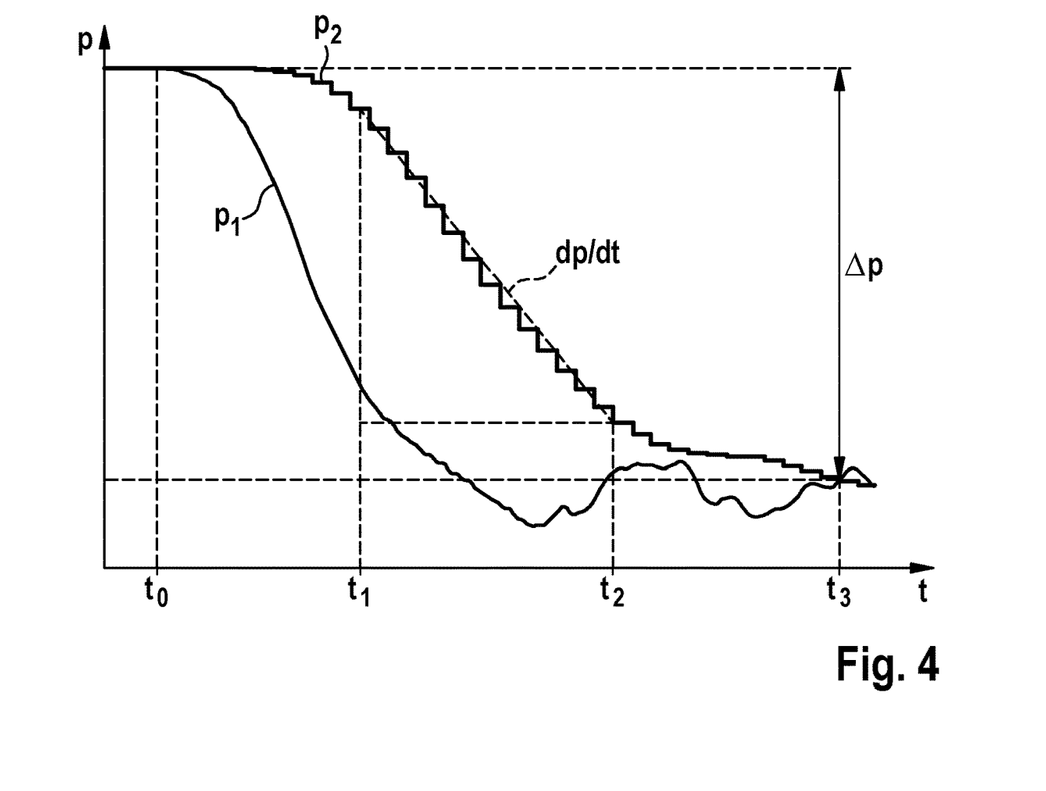
FIG. 4 schematically shows a pressure profile, on the basis of which a part of the method according to the present invention in one preferred specific embodiment is explained.

A pressure profile having a pressure p over time t is schematically shown in FIG. 4, on the basis of which a part of a method according to the present invention in one preferred specific embodiment is explained. In this case, $p_1$ indicates the real pressure profile in high pressure accumulator, $p_2$ in contrast indicates the profile of this pressure ultimately present as a result of measurement in the engine control unit, which is not only discretized, but also time-delayed.

The determination of the through-flow from gradient dp/dt of a, for example, undisrupted drop of pressure p in the high pressure accumulator during injection takes place, for example, by determining the pressure at two defined points in time $t_1$ at the start and $t_2$ at the end of the pressure drop triggered by the injection and by forming the pressure difference. Gradient dp/dt of the pressure drop derived in this manner represents a direct measure of the nozzle through-flow or the coking when the nozzle needle is opened.

The conditions and tolerances of the detection of the pressure in the high pressure accumulator influence the quality of the model. Thus, the real-time pressure in the high pressure accumulator is generally not available in the engine control unit, as may be seen in the diagram, but merely a filtered time-discrete signal.

As mentioned, a further procedure for ascertaining the coking is the determination of the ratio of a quantity of fuel introduced during an injection of the fuel injector and a time duration of the injection as a direct measure of the coking. The injection quantity may, as mentioned, be determined via pressure drop $\Delta p$ between two defined points in time $t_0$ and $t_3$ before and after the injection, which is shown in FIG. 4. The injection duration is generally known in the engine control unit or may be ascertained as explained, for example, with reference to FIG. 3 (then there as $i_s$–$t_o$). Within the scope of the method, it is provided for data-based model 200 to use individual discrete features of a pressure profile in the high pressure accumulator, i.e., individual discrete measured pressures of a pressure profile in the high pressure accumulator. In this case, discrete features/pressures of a pressure drop of the pressure profile in the high pressure accumulator are to be used. In particular, four, in particular preferably exactly four determined pressures ascertained by measuring are to be used.

These pressures are, in particular, pressure $p_2$ at point in time $t_0(p_2(t_0))$, pressure $p_2$ at point in time $t_1(p_2(t_1))$, pressure $p_2$ at point in time $t_2(p_2(t_2))$ and pressure $p_2$ at point in time $t_3(p_2(t_3))$. This means, that pressure $p_2(t_0)$ is to be used—in particular immediately—prior to the injection, pressure $p_2(t_3)$—in particular immediately after the injection, pressure $p_2(t_1)$ at the start of the free injection and pressure $p_2(t_2)$ at the end of the free injection for data-based model 200. Pressure $p_2(t_1)$ and pressure $p_2(t_2)$ are thus determined at points in time, which describe an undisrupted drop (in particular, at the lowest flow resistance) of pressure $p_2$ in the high pressure accumulator (start, end).

Figure 5:
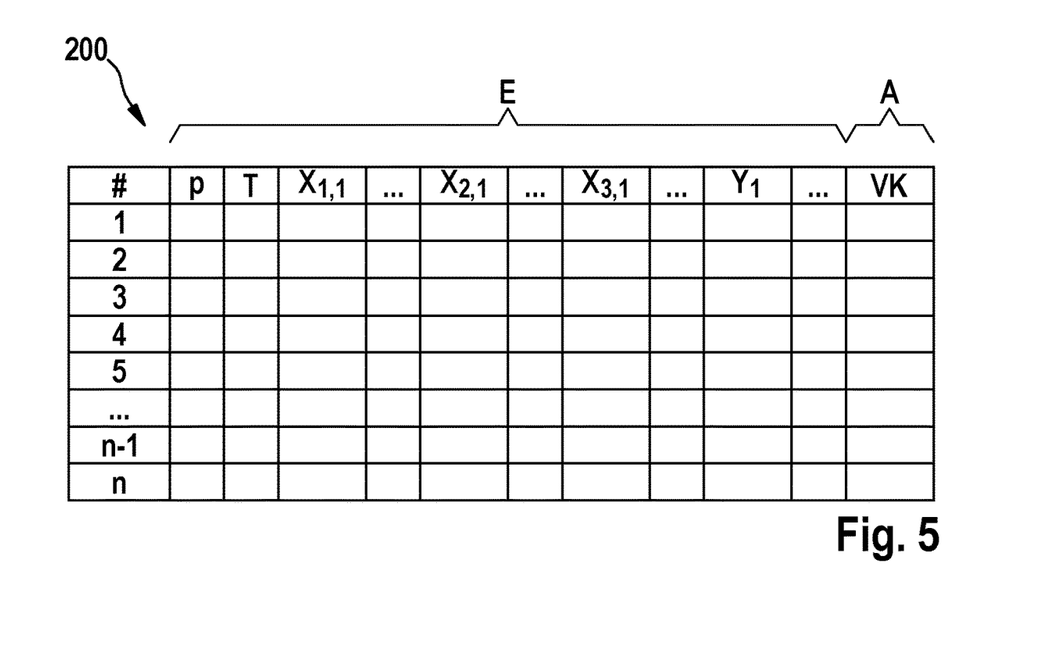
FIG. 5 schematically shows model data of a data-based model, which may be used in a method according to the present invention in one preferred specific embodiment.

A data structure of the model data for creating a data-based model, in particular coking model 200, is schematically shown in FIG. 5, which may be used in a method according to the present invention in one preferred specific embodiment. Model 200 obtains as input variables E, for example, instantaneous pressure p as well as instantaneous temperature T of the fuel in the high pressure accumulator and, in addition, the required parameters or variables indicated here with $X_{1,1}, \ldots, X_{2,1}, \ldots, X_{3,1}, \ldots$ and $X_{4,1}, \ldots$ required by the various methods or approaches that have been explained in greater detail with respect to FIGS. 3 and 4. Geometric data or manufacturing data indicated here with $Y_1, \ldots$ may also be taken into consideration.

In model data 200, various data sets, represented by way of example are lines 1 through n, may be taken into consideration or combined with one another in a suitable manner, so that a measure VK results in each case as output variable A for the variable characterizing the flow rate and thus also for the coking. This measure VK may, for example, be indicated in percent of nominal or original flow rate. If needed, the input variables or the corresponding parameters may be viewed as relative to a nominal injector.

Figure 6:
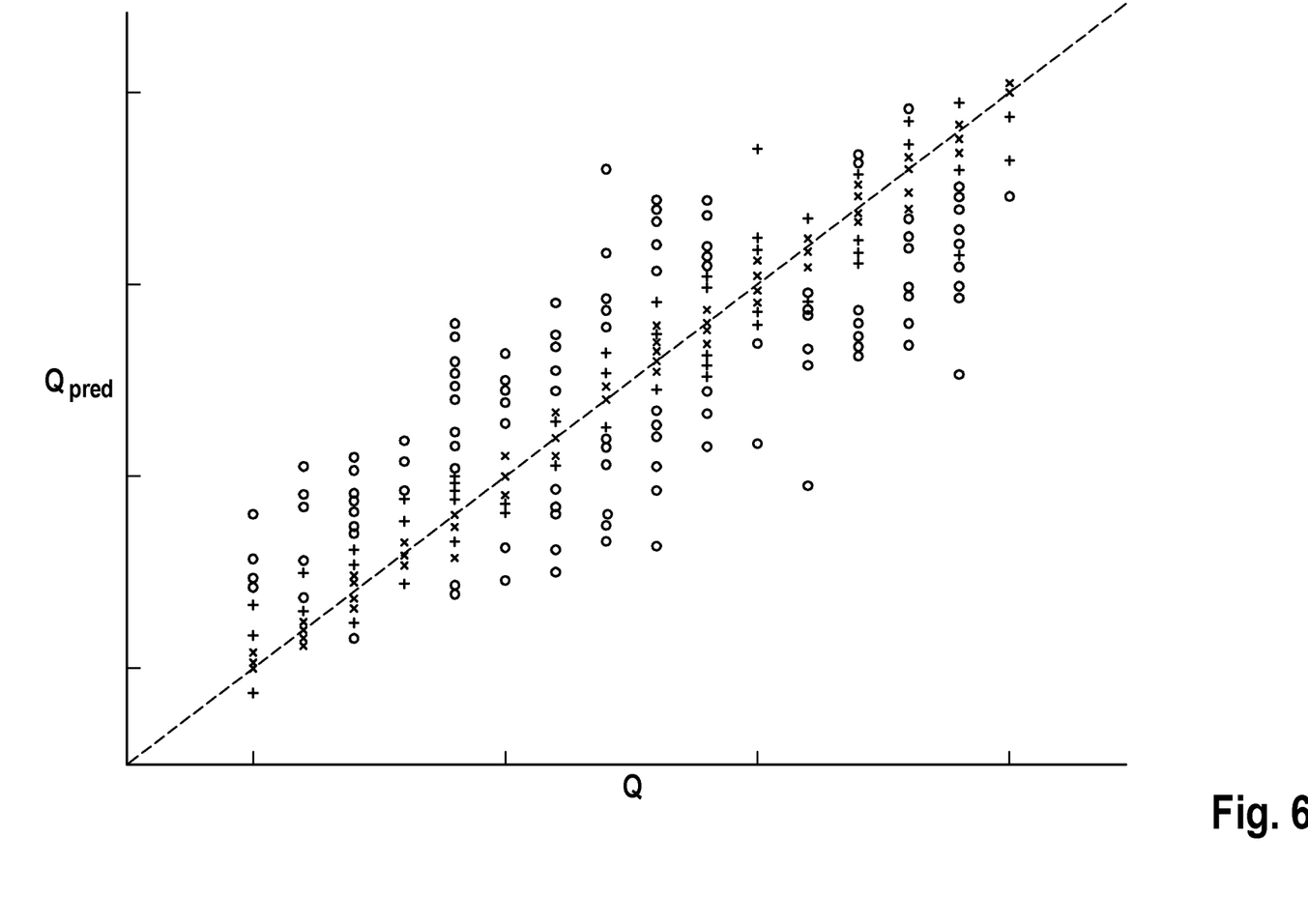
FIG. 6 schematically shows a comparison for the accuracy in a method according to the present invention in one preferred specific embodiment and in a method not according to the present invention.

A comparison for the accuracy in a method according to the present invention in one preferred specific embodiment and in a method not according to the present invention is schematically represented in FIG. 6. For this purpose, an estimated or calculated flow rate $Q_{pred}$ is plotted over a real flow rate Q, the dashed diagonal indicating $Q_{pred}$=4, i.e., the ideal case.

The points represented with a circle correspond in this case to a flow rate estimated or calculated (only) with the aid of one approach while determining the return point in time and closing duration of the nozzle needle, the points represented with a cross or an X correspond, purely by way of example and for illustrating the tendency in a method, with the explained data-based model for determining the flow rate or the coking. In this case, it is clearly apparent that as a result, the accuracy is significantly greater than before.

What is claimed is:

1. A method for ascertaining a variable characterizing a flow rate of a fuel injector during an operation of an internal combustion engine to which the fuel injector is assigned, the method comprising the following steps:
    ascertaining at least two input values for a data-based model;
    determining at least one output value with the aid of the data-based model; and ascertaining, based on the at least one output value, a value for the variable characterizing the flow rate of the fuel injector;

wherein:
the data-based model combines at least two methods differing from one another for ascertaining the variable characterizing the flow rate of the fuel injector; and the method includes at least one of the following features (a)-(g):
(a) the data-based model includes a method for ascertaining the variable characterizing the flow rate of the fuel injector by determining a pressure-dependent measure of the variable based on a return point in time of a nozzle needle of the fuel injector and/or on a closing duration of the nozzle needle of the fuel injector;
(b) the data-based model includes a method for ascertaining the variable characterizing the flow rate of the fuel injector by determining a measure of the variable in a range of a closing point in time of the nozzle needle of the fuel injector based on characteristics of a profile of a signal of a sensor, the sensor detecting an opening and/or closing of the fuel injector;
(c) the data-based model includes a method for ascertaining the variable characterizing the flow rate of the fuel injector by determining a measure of an injected quantity of fuel based on a start of delivery of a high-pressure pump;
(d) the data-based model includes a method for ascertaining the variable characterizing the flow rate of the fuel injector based on a pressure change in a high-pressure accumulator via which the fuel injector is supplied caused by an injection of the fuel injector, and/or based on a pressure gradient in the high-pressure accumulator;
(e) the data-based model includes a method for ascertaining the variable characterizing the flow rate of the fuel injector based on a ratio of a quantity of fuel introduced during the injection of the fuel injector and a time duration of the injection;
(f) geometric parameters of the fuel injector are taken into consideration in the data-based model; and
(g) at least two input values for the data-based model are selected or derived from values of the following variables (1)-(8):
(1) the return point in time of the nozzle needle of the fuel injector;
(2) the closing duration of the nozzle needle of the fuel injector;
(3) the characteristics of the profile of the signal of the sensor that detects the opening and/or closing of the fuel injector in the range of the closing point in time of the nozzle needle of the fuel injector;
(4) the start of delivery of the high pressure pump;
(5) the pressure change caused by the injection of the fuel injector;
(6) the pressure change in the high-pressure accumulator caused by the injection of the fuel injector;
(7) the pressure gradient in the high-pressure accumulator; and
(8) the ratio of the quantity of fuel introduced during the injection of the fuel injector and the time duration of the injection.

2. The method as recited in claim 1, wherein the at least one output value is ascertained with the aid of the data-based model, using machine learning.

3. The method as recited in claim 2, wherein the data-based model is an artificial neural network.

4. The method as recited in claim 1, wherein the variable characterizing the flow rate of the fuel injector includes an absolute or relative flow rate of the fuel injector.

5. The method as recited in claim 1, wherein at least one activation parameter for the fuel injector is adapted based on the ascertained value for the variable characterizing the flow rate of the fuel injector.

6. The method as recited in claim 1, wherein the data-based model includes the method for ascertaining the variable characterizing the flow rate of the fuel injector by determining the pressure-dependent measure of the variable based on the return point in time of the nozzle needle of the fuel injector and/or on the closing duration of the nozzle needle of the fuel injector.

7. The method as recited in claim 1, wherein the data-based model includes the method for ascertaining the variable characterizing the flow rate of a fuel injector by determining the measure of the variable in the range of the closing point in time of the nozzle needle of the fuel injector based on the characteristics of the profile of the signal of the sensor that detects the opening and/or closing of the fuel injector.

8. The method as recited in claim 1, wherein the data-based model includes the method for ascertaining the variable characterizing the flow rate of the fuel injector by determining the measure of the injected quantity of fuel based on the start of delivery of the high-pressure pump.

9. The method as recited in claim 1, wherein the data-based model includes the method for ascertaining the variable characterizing the flow rate of the fuel injector based on the pressure change in the high-pressure accumulator caused by the injection of the fuel injector, and/or based on the pressure gradient in the high-pressure accumulator.

10. The method as recited in claim 1, wherein the data-based model includes the method for ascertaining the variable characterizing the flow rate of the fuel injector based on the ratio of the quantity of fuel introduced during the injection of the fuel injector and the time duration of the injection.

11. The method as recited in claim 1, wherein the geometric parameters of the fuel injector are taken into consideration in the data-based model.

12. The method as recited in claim 1, wherein the at least two input values for the data-based model are selected or derived from the values of the variables (1)-(8).

13. A processing unit configured to perform a method for ascertaining a variable characterizing a flow rate of a fuel injector during an operation of an internal combustion engine to which the fuel injector is assigned, the method including the processing unit performing the following:
ascertaining at least two input values for a data-based model;
determining at least one output value with the aid of the data-based model; and
ascertaining, based on the at least one output value, a value for the variable characterizing the flow rate of the fuel injector;

wherein:
the data-based model combines at least two methods differing from one another for ascertaining the variable characterizing the flow rate of the fuel injector; and the method includes at least one of the following features (a)-(g):
(a) the data-based model includes a method for ascertaining the variable characterizing the flow rate of the fuel injector by determining a pressure-dependent measure of the variable based on a return point in time of a nozzle needle of the fuel injector and/or on a closing duration of the nozzle needle of the fuel injector;
(b) the data-based model includes a method for ascertaining the variable characterizing the flow rate of the fuel injector by determining a measure of the variable in a range of a closing point in time of the nozzle needle of the fuel injector based on characteristics of a profile of a signal of a sensor, the sensor detecting an opening and/or closing of the fuel injector;
(c) the data-based model includes a method for ascertaining the variable characterizing the flow rate of the fuel injector by determining a measure of an injected quantity of fuel based on a start of delivery of a high-pressure pump;
(d) the data-based model includes a method for ascertaining the variable characterizing the flow rate of the fuel injector based on a pressure change in a high-pressure accumulator via which the fuel injector is supplied caused by an injection of the fuel injector, and/or based on a pressure gradient in the high-pressure accumulator;
(e) the data-based model includes a method for ascertaining the variable characterizing the flow rate of the fuel injector based on a ratio of a quantity of fuel introduced during the injection of the fuel injector and a time duration of the injection;
(f) geometric parameters of the fuel injector are taken into consideration in the data-based model; and
(g) at least two input values for the data-based model are selected or derived from values of the following variables (1)-(8):
(1) the return point in time of the nozzle needle of the fuel injector;
(2) the closing duration of the nozzle needle of the fuel injector;
(3) the characteristics of the profile of the signal of the sensor that detects the opening and/or closing of the fuel injector in the range of the closing point in time of the nozzle needle of the fuel injector;
(4) the start of delivery of the high pressure pump;
(5) the pressure change caused by the injection of the fuel injector;
(6) the pressure change in the high-pressure accumulator caused by the injection of the fuel injector;
(7) the pressure gradient in the high-pressure accumulator; and
(8) the ratio of the quantity of fuel introduced during the injection of the fuel injector and the time duration of the injection.

14. A non-transitory machine-readable memory medium on which is stored a computer program for ascertaining a variable characterizing a flow rate of a fuel injector during an operation of an internal combustion engine to which the fuel injector is assigned, the computer program being executable by a processing unit and, when executed by the processing unit, causing the processing unit to perform a method that includes the following steps:
ascertaining at least two input values for a data-based model;
determining at least one output value with the aid of the data-based model; and
ascertaining, based on the at least one output value, a value for the variable characterizing the flow rate of the fuel injector;
wherein:
the data-based model combines at least two methods differing from one another for ascertaining the variable characterizing the flow rate of the fuel injector; and the method includes at least one of the following features (a)-(g):
(a) the data-based model includes a method for ascertaining the variable characterizing the flow rate of the fuel injector by determining a pressure-dependent measure of the variable based on a return point in time of a nozzle needle of the fuel injector and/or on a closing duration of the nozzle needle of the fuel injector;
(b) the data-based model includes a method for ascertaining the variable characterizing the flow rate of the fuel injector by determining a measure of the variable in a range of a closing point in time of the nozzle needle of the fuel injector based on characteristics of a profile of a signal of a sensor, the sensor detecting an opening and/or closing of the fuel injector;
(c) the data-based model includes a method for ascertaining the variable characterizing the flow rate of the fuel injector by determining a measure of an injected quantity of fuel based on a start of delivery of a high-pressure pump;
(d) the data-based model includes a method for ascertaining the variable characterizing the flow rate of the fuel injector based on a pressure change in a high-pressure accumulator via which the fuel injector is supplied caused by an injection of the fuel injector, and/or based on a pressure gradient in the high-pressure accumulator;
(e) the data-based model includes a method for ascertaining the variable characterizing the flow rate of the fuel injector based on a ratio of a quantity of fuel introduced during the injection of the fuel injector and a time duration of the injection;
(f) geometric parameters of the fuel injector are taken into consideration in the data-based model; and
(g) at least two input values for the data-based model are selected or derived from values of the following variables (1)-(8):
(1) the return point in time of the nozzle needle of the fuel injector;
(2) the closing duration of the nozzle needle of the fuel injector;
(3) the characteristics of the profile of the signal of the sensor that detects the opening and/or closing of the fuel injector in the range of the closing point in time of the nozzle needle of the fuel injector;
(4) the start of delivery of the high pressure pump;
(5) the pressure change caused by the injection of the fuel injector;
(6) the pressure change in the high-pressure accumulator caused by the injection of the fuel injector;
(7) the pressure gradient in the high-pressure accumulator; and
(8) the ratio of the quantity of fuel introduced during the injection of the fuel injector and the time duration of the injection.

* * * * *